Figure 1:
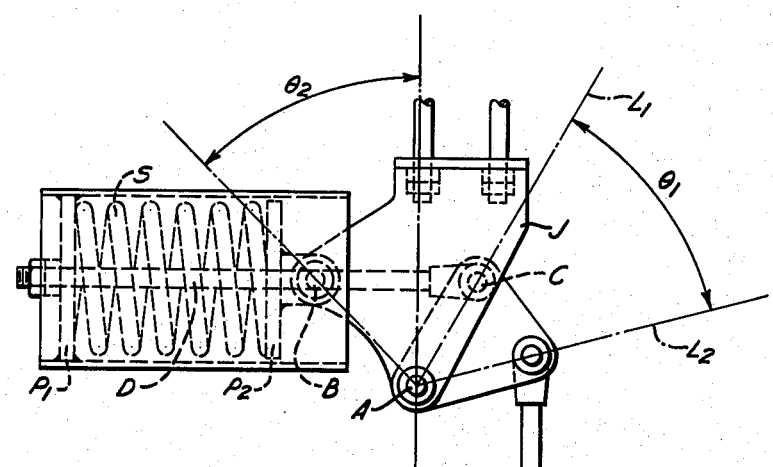

July 26, 1960

C. G. GRABE 2,946,547

CONSTANT SUPPORT HANGER

Filed March 3, 1959

7 Sheets-Sheet 1

INVENTOR.
CLARENCE G. GRABE

July 26, 1960
C. G. GRABE
2,946,547
CONSTANT SUPPORT HANGER
Filed March 3, 1959
7 Sheets-Sheet 2
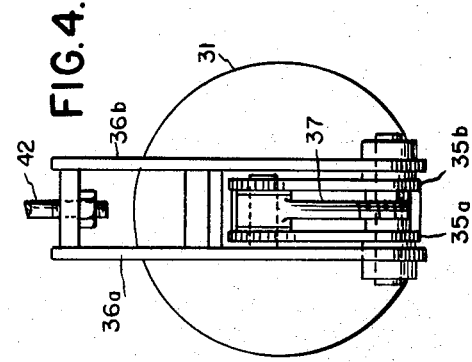
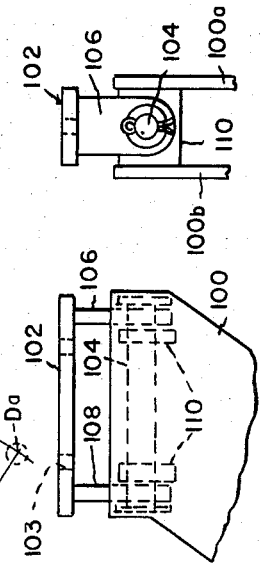
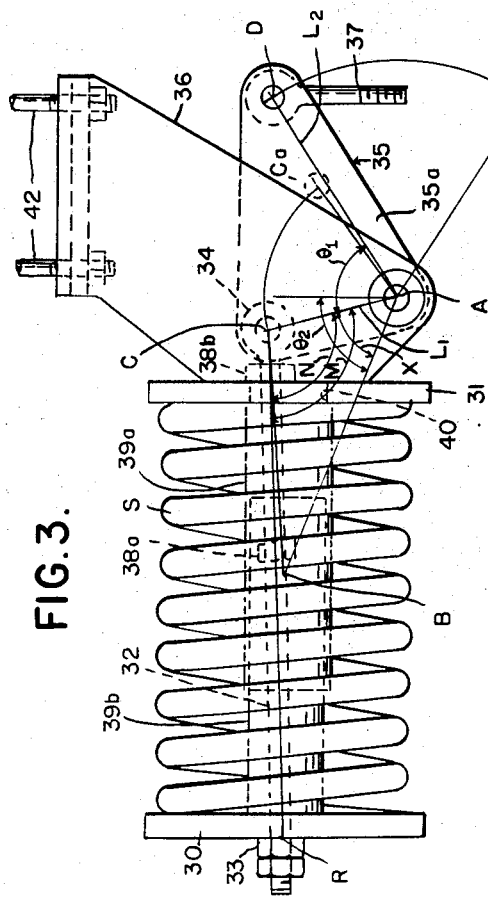
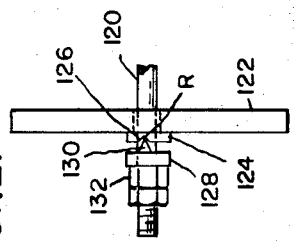
INVENTOR.
CLARENCE G. GRABE
BY Whittemore
Hulbert & Belknap
ATTORNEYS July 26, 1960

C. G. GRABE 2,946,547

CONSTANT SUPPORT HANGER

Filed March 3, 1959

7 Sheets-Sheet 3

INVENTOR.
CLARENCE G. GRABE
BY Whittemore,
Hulbert & Belknap
ATTORNEYS

July 26, 1960
C. G. GRABE
2,946,547
CONSTANT SUPPORT HANGER
Filed March 3, 1959
7 Sheets-Sheet 4
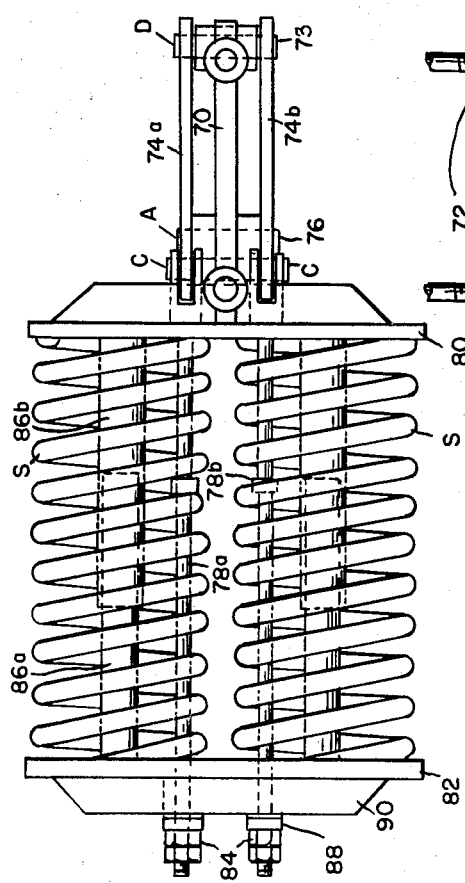
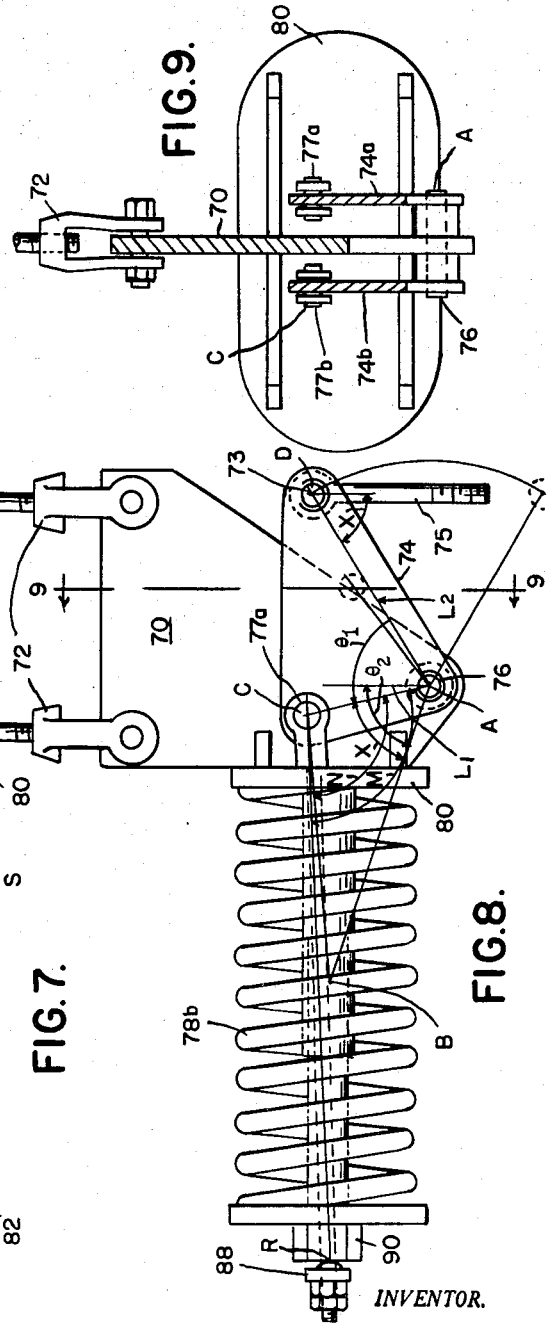
INVENTOR.
CLARENCE G. GRABE
BY
ATTORNEYS

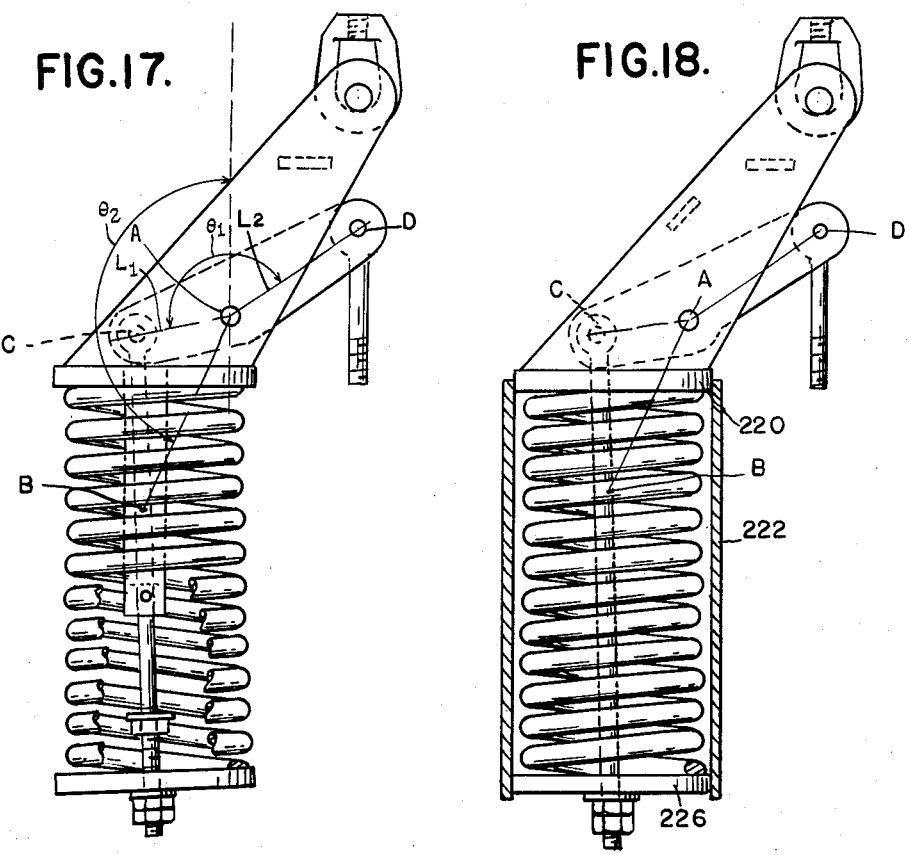

July 26, 1960  C. G. GRABE  2,946,547
CONSTANT SUPPORT HANGER
Filed March 3, 1959  7 Sheets-Sheet 7

INVENTOR.
CLARENCE G. GRABE

United States Patent Office 2,946,547
Patented July 26, 1960

2,946,547

CONSTANT SUPPORT HANGER

Clarence G. Grabe, Royal Oaks, Md., assignor to National Valve & Manufacturing Company, Pittsburgh, Pa., a corporation of Delaware Filed Mar. 3, 1959, Ser. No. 799,400

11 Claims. (Cl. 248—54)

This invention relates to a hanger which will provide constant support for a load of constant weight, regardless of vertical movement of the load. The invention may be applied wherever a load of constant weight is subjected to a limited range of movement, and must be given constant support during that limited movement.

The invention is particularly useful for supporting the heavy pipe lines used to conduct steam in power plants. Due to the high temperatures and pressures used for the steam, these pipes must have thick walls and are very heavy. The large variation between room temperature and operating temperature causes considerable expansion and contraction of the lines, and hence considerable movement of the lines relative to the supporting structures. The hanger of the present invention provides constant support for such lines without interfering with movement of the piping due to temperature changes.

The need for supports of this nature has long been recognized, and many efforts have been made to fill this need. But up to the present these efforts have resulted in devices which have inherent weaknesses, are complicated, and relatively costly.

The present invention provides a practical constant support hanger that approaches more nearly to the ideal constant support than any heretofore produced, yet is simple and rugged in construction and economical to manufacture.

These and other objects and advantages of the invention will become apparent as the description proceeds.

Figure 2:
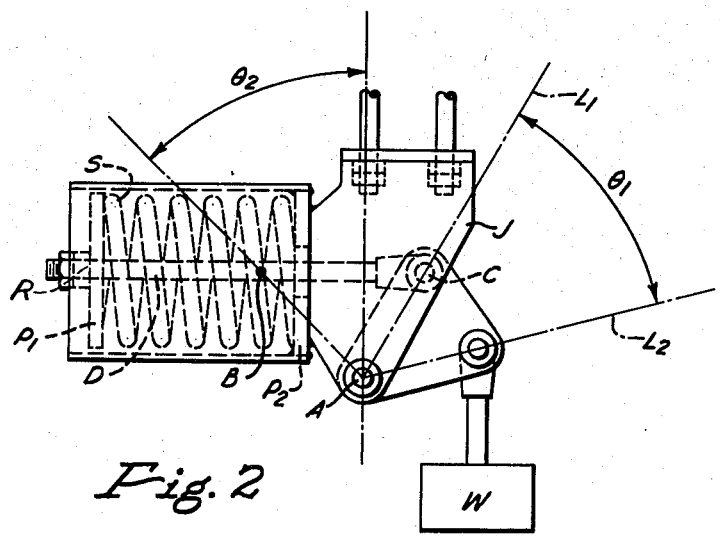
Figure 6:
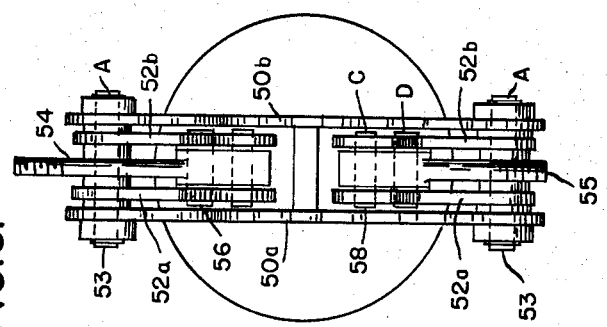
Figure 5:
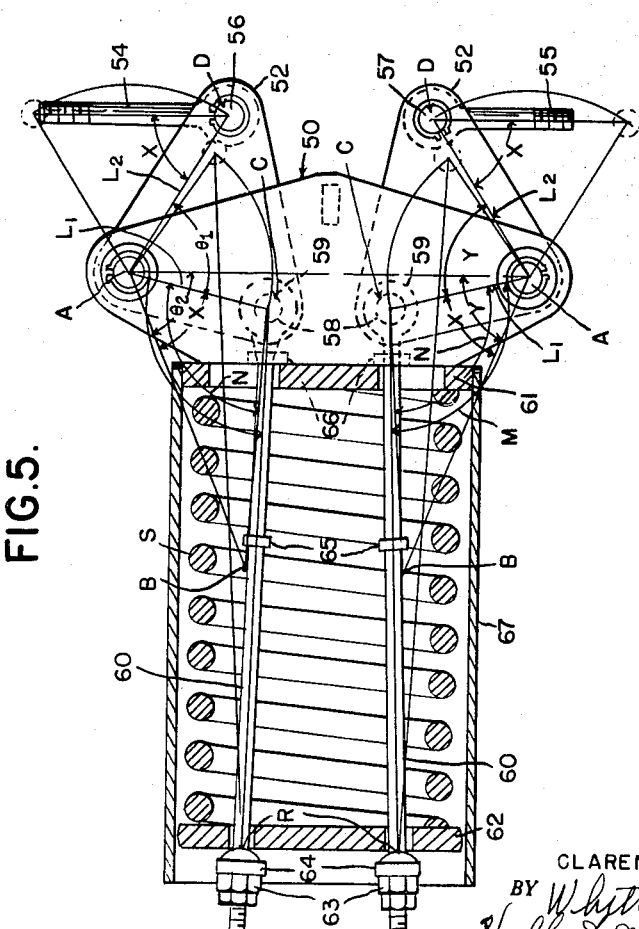
Figure 13:
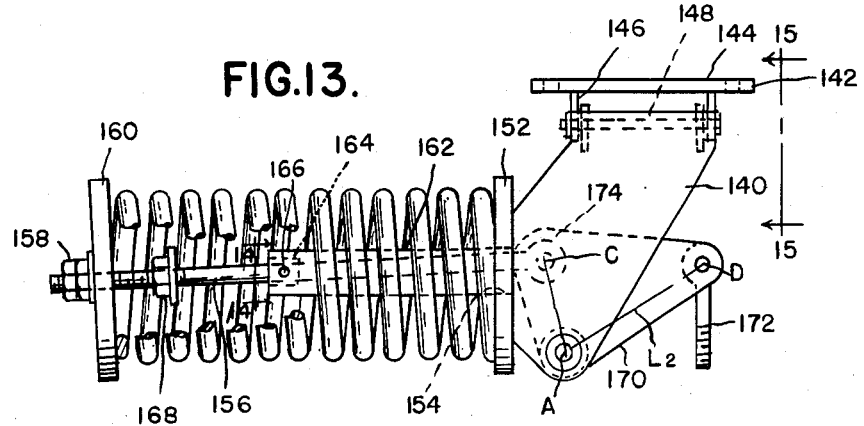
Figures 14, 15, 16:
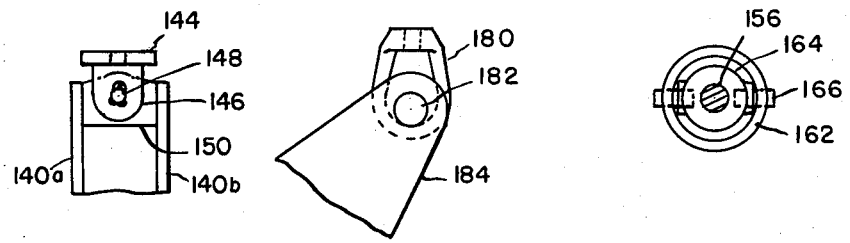
Figure 19:
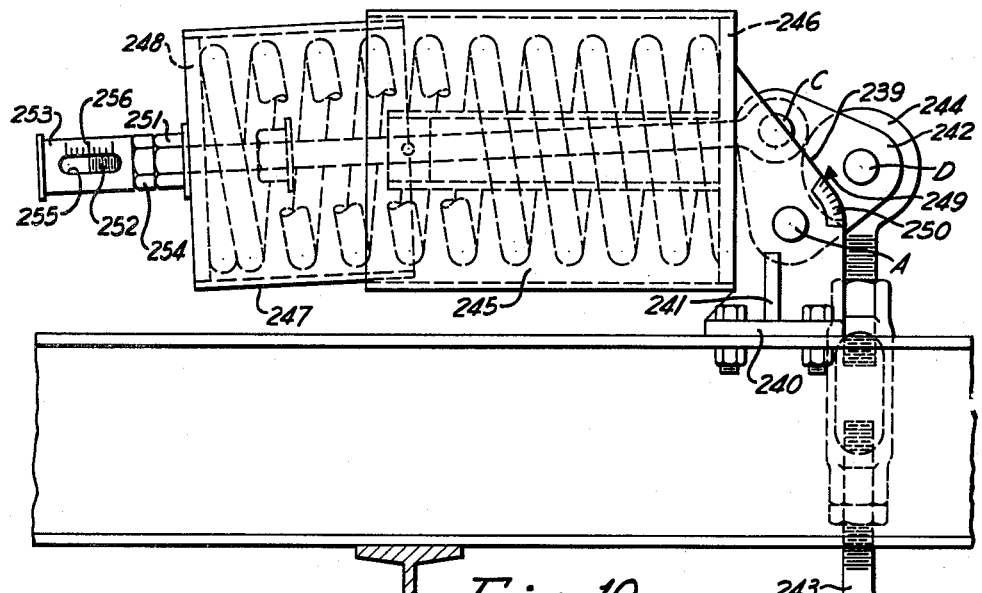
Figure 20:
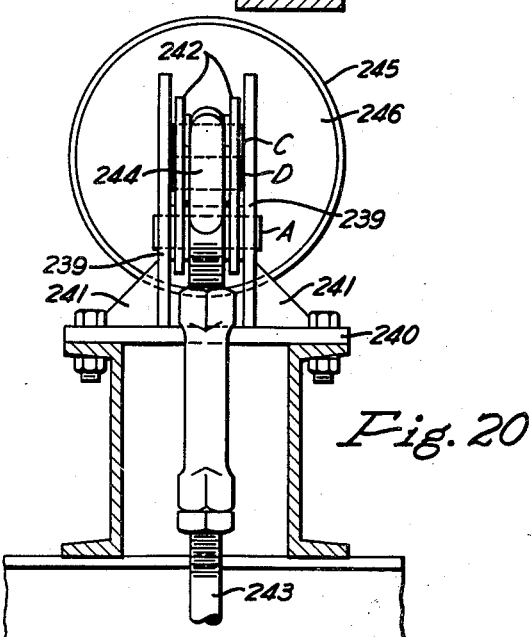

In the drawings:

Fig. 1 is a diagram of a prior-art form of hanger;
Fig. 2 is a diagram illustrating the present invention;
Fig. 3 is a side elevation of one form of the invention;
Fig. 4 is an end view of the device of Fig. 3;
Fig. 5 is a side elevation of a modification;
Fig. 6 is an end view of the device of Fig. 5;
Fig. 7 is a plan view of a modification;
Fig. 8 is a side elevation of the device of Fig. 7;
Fig. 9 is a section on line 9—9 of Fig. 8;
Fig. 10 is an elevation of a modified support;
Fig. 11 is an end view of the device of Fig. 10;
Fig. 12 is an elevation of a modified pivot;
Fig. 13 is an elevation of a modification;
Fig. 14 is a section on line 14—14 of Fig. 13;
Fig. 15 is a section on line 15—15 of Fig. 13;
Fig. 16 is an elevation of a modified support;
Fig. 17 is an elevation of a modification;
Fig. 18 is an elevation partly in section of a modification;
Fig. 19 is an elevation of a modification; and
Fig. 20 is an end view of the device of Fig. 19.

The present application is a continuation-in-part of my prior applications Serial No. 489,533 filed February 21, 1955, now abandoned and Serial No. 680,347 filed August 26, 1957, now abandoned.

Modern steam power plants use steam under high pressure, and at temperatures up to 1100° F. The pipe lines used to conduct steam under these conditions must have quite thick walls, and as the piping is often of large diameter, the pipe lines are very heavy.

The variation between room temperature and 1100° F. is quite large, so that whenever the power plant is started up or shut down the piping is subject to considerable expansion or contraction due to this change in temperature.

In designing the power plant the construction engineers make careful stress analyses and load and expansion calculations in order to design the piping and supporting structures to withstand the loads they must carry when in operation. But these precautions are to no avail if improper supporting means permits excessive pipe deflection, or misalignment strains on equipment.

The present invention provides a hanger which can be installed to give the piping constant support while permitting it to move freely under the forces of thermal expansion or contraction. It therefore meets all of the critical requirements mentioned above.

At first approach it might seem simple and convenient to support the piping directly by means of coil compression springs, since they would permit the piping to move under thermal expansion and contraction. However, when a coil spring is compressed the resistance of the spring increases, and as a result the amount of support would not be the same for all positions of the spring. The tendency of the spring to provide increased resistance as it is compressed must be offset in some way if a uniform supporting force is to be provided.

This fact has been recognized in the industry for a long time, and many efforts have been made to provide an offsetting force by means of leverage systems. One of the best of these efforts is represented by Gould Patent 2,709,057, in which the offsetting force is provided by a leverage system arranged in such a way that theoretically the mechanical advantage of the leverage system increases at the same rate at which the resistance of the spring increases. The converse is also true. This system theoretically provides perfect constant support, but I have found that in commercial operations the Gould system has certain defects, and my invention is an improvement on the device of the Gould patent.

Fig. 1 is a diagram illustrating a commercial form of hanger using the leverage system disclosed in the Gould patent. It will be necessary to summarize briefly the important features of the Gould system in order to explain clearly the improvement of the present invention. The requirements of the Gould system may be explained in simple mechanical terms as follows:

(1) Coil spring S must have a constant rate of change of resistance throughout its useful range.

(2) A bell crank is pivoted at A to a supporting member J, and has a balance arm $L_1$ which is connected to the spring rod D, and a load arm $L_2$ which supports the load W.

(3) Spring rod D has one end pivoted to the balance arm at the balance pivot C, and its opposite end connected to a compressor plate $P_1$, so that a pull on the rod D will move the compressor plate $P_1$ to compress the spring against spring seat $P_2$. The spring S and spring rod D form a spring assembly.

(4) The spring assembly is pivoted to rock as a unit about spring pivot B on the supporting member J.

(5) The distance between the spring pivot B and the balance pivot C is equal to the total deflection of the spring for the particular position of the balance arm $L_1$.

(6) The spring pivot B must have a certain location relative to pivot A of the bell crank. This location can be arrived at as follows:

(a) Draw a line through the pivot A of the bell crank, and parallel to the direction of the load. This may be called the "load axis."

(b) Draw a line passing through the spring pivot B and the pivot A of the bell crank. This line may be called the "deflection line."

(c) The angle $\theta_2$ between lines (a) and (b) must be equal to the angle $\theta_1$ between the arms of the bell crank. Stated in another way, the deflection line A—B is inclined toward the spring from the load axis at an angle equal to and in the same direction from the load axis as the angle and direction at which the balance arm $L_1$ is located from the load arm $L_2$.

The Gould patent contains a mathematical demonstration which proves that when the above factors are satisfied the hanger will theoretically provide constant support for all operating positions within the range provided by the dimensions of the hanger.

However, from actual commercial operation it has been found that certain practical considerations detract from the theoretical perfection predicted by the mathematical proof. These practical considerations include the care required in assembly and maintenance, misalignment of parts in assembly, and friction which develops in heavily loaded pivots.

The present invention provides a deliberate departure from the requirements indicated by the mathematical proof by eliminating entirely the spring pivot B, and mounting the seat for spring S rigidly on the supporting member J. This change introduces a theoretical inaccuracy in the proof, but in practical operation this inaccuracy is more than overcome by the elimination of friction at a heavily loaded pivot point. Further improvement in performance is obtained as a result of simplification of assembly and maintenance. The result is that an actual commercial device constructed according to the present invention gives greater accuracy under operating conditions than one constructed according to the theoretically correct design, as disclosed in the Gould patent.

Fig. 2 is a diagram similar to Fig. 1 but illustrating a hanger of the present invention. It will be seen that Fig. 2 is identical with Fig. 1 as regards the mounting of the bell crank and its support of the load W. The difference lies in the mounting of the spring system.

In Fig. 2 the spring seat $P_2$ for spring S is rigidly mounted relative to the supporting structure J. This may be done as indicated in Fig. 2 by welding the spring casing to support J, and welding supporting plate $P_2$ to the casing.

Spring rod D passes through a slot formed in supporting plate $P_2$, so as to permit a slight amount of lateral movement of the spring rod.

It will be seen therefore that in Fig. 2, as in Fig. 1, downward movement of the weight W from the position shown will cause the bell crank lever to draw toward the right the end of spring rod D attached at pivot C. This movement will compress spring S, thereby causing increased resistance by spring S. But during this movement the changing angle of the bell crank increases the mechanical advantage of the leverage system to offset the increased resistance of the spring.

As weight W moves downward, the end of spring rod D is carried downward by the arc described by pivot C.

In Fig. 1 this downward movement of this end of spring rod D is permitted by the fact that the spring assembly rocks about pivot B, thus permitting the outer end of the spring assembly to move upward.

In Fig. 2, during this downward movement of pivot C, the spring rod D pivots about point R where it contacts compression plate $P_1$. This pivoting at the outer end is permitted, partly by movement of rod D in its loose mounting in plate $P_1$, and partly by the fact that compression plate $P_1$ becomes slightly tilted, thus compressing one side of spring S more than the other.

The slot in the spring seat $P_2$ accommodates the lateral movement of the middle portion of the spring rod D.

It was stated above in connection with Fig. 1 that in the theoretically perfect device, "the distance between the spring pivot B and the balance pivot C is equal to the total deflection of the spring for the particular position of the balance arm $L_1$" (element No. 5), and that to obtain this result the spring pivot B must be located relative to the pivot A of the bell crank in a certain manner (element No. 6).

In the device of Fig. 2 a deflection point B is located in substantially the same relation to the pivot A as is the spring pivot B of Fig. 1. But in Fig. 2 the deflection point B is not a pivot point, but is merely a point used in measuring the spring deflection.

Assuming that the spring rod D is in its central position, as in Fig. 2, the deflection point B is located as follows:

(a) Draw a line through the pivot of the bell crank and parallel to the direction of the load. This line is the same "load axis" as in Fig. 1.

(b) Lay out a deflection line passing through the pivot of the bell crank and inclined to the "load axis" and toward the spring S at an angle equal to and in the same direction from the load axis as the angle and direction at which the balance arm $L_1$ is located from the load arm $L_2$.

(c) The point where line (b) intersects the axis of the spring rod D is the deflection point B.

So far as measuring spring deflection is concerned, the deflection point B of Fig. 2 is the equivalent of the pivot B of Fig. 1. It is therefore necessary in assembling the device of Fig. 2 to depress the spring S to such an extent that its deflection is equal to the distance between the balance pivot C and the deflection point B.

Therefore, when the spring rod D is in its central position, as shown in Fig. 2, the device of Fig. 2 provides a supporting force exactly equal to the load, and equal to the theoretical perfection of Fig. 1.

When the load W moves up or down from the position of Fig. 2, the pivot point C will swing in an arc as dictated by balance arm $L_1$ and this end of spring rod D will move above or below its central position. In these cases the spring rod D pivots about its outer end, as explained above, and deflection point B moves away from its central position. However, since the hanger is designed to accommodate only limited movement of the load, the deviation of the deflection point B from its central position is so slight as to have negligible influence on the accuracy of the support provided in the extreme positions of the hanger.

In designing commercial devices based on the principles of Fig. 2 it is possible to keep the angular difference in the extreme positions of the spring rod D quite small by advantageously proportioning the length of the spring arm and limiting the travel of the end attached to balance pivot C to an angle of not over 70 degrees.

It has been found that with hangers made according to the present invention, the calculated performance of the hanger when in its extreme positions of movement will have from 95.5% to 98% of theoretically perfect performance. And it has also been found that this slight theoretical deficiency is more than offset by the improved performance resulting from elimination of the heavily loaded pivot at B. Furthermore, the mounting of the spring seat directly on supporting member J by welding, or equivalent means, makes for structural improvement, and for easier assembly and maintenance. Specifically the improved hanger of Fig. 2 provides the following advantages:

(1) Influence of the weight of the spring assembly is eliminated. In the device of Fig. 1 a substantial part of the weight of the spring assembly is supported by the spring rod. In large hangers this weight may be several hundred pounds, and its influence on hanger performance is appreciable.

(2) The spring assembly can be placed closer to the bell crank, thus decreasing the over-all hanger length.

(3) Since deflection point B is theoretical it requires no mechanical provision in the design and can therefore be located well within the spring, which is difficult to do in a design having a pivoted spring assembly. Moreover, the location of point B can be changed by making a few minor adjustments hereinafter stated, to adapt the device for a wide range of load and travel requirements with a few basic parts.

(4) Friction at point B is eliminated. In the above theoretical analysis of Fig. 1, frictional resistance at the pivots has been disregarded. However, as mentioned above, spring pivot B is heavily loaded, and the considerable friction developed here prevents the hanger from providing in commercial use the full theoretical advantage. The present invention, by eliminating pivot B, provides in commercial use even better performance than the device of Fig. 1.

The above general statements show the many advantages of the invention. Reference will now be made to several practical embodiments.

Figs. 3 and 4 illustrate a commercial form embodying the principles illustrated in Fig. 2.

In Figs. 3 and 4 the spring assembly includes a compressor plate 30 and a spring seat 31, with a coil spring S held in compression between them by a spring rod 32. A nut 33 is threaded on the outer end of the spring rod and bears against the compressor plate 30, thereby establishing the point R, which is the pivot point for the spring rod. The spring rod 32 carries at its other end an eye 34 which is pivoted at the balance pivot C to a bell crank assembly 35.

The bell crank assembly comprises a pair of identical plates 35a and 35b, which are pivoted at pivot A to the supporting member 36 comprising identical plates 36a and 36b, which are spaced apart to receive between them the bell crank assembly 35. Two bell crank plates 35a and 35b are used because they can be placed on opposite sides of the pivot ends of the spring rod 32 and of the hanger rod 37, thus simplifying the structure of these pivots.

Each of the bell crank plates is triangular in shape, but so far as the geometry of the device is concerned each of these plates can be considered as having a balance arm, indicated by the line $L_1$, and a load arm, indicated by the line $L_2$, which correspond with the similar arms of Fig. 2.

The spring assembly is rigidly mounted by welding the spring seat 31 to the support member 36. The support member is in turn attached by rods 42 to the building or other structural part.

The spring rod passes through a slot 40 formed in spring seat 31, thus permitting the lateral movement of the spring rod as it swings about its pivot point R.

In designing and assembling the device of Figs. 3 and 4, deflection point B is located in the manner previously described, i.e., by laying out angle $\theta_2$ toward the spring side of the vertical line through axis A, said angle $\theta_2$ being equal to the angle $\theta_1$ between the arms $L_1$ and $L_2$ of the bell crank. The line established by angle $\theta_2$ becomes line A—B, point B being the point where the line crosses the axis of the spring rod when said rod is in its central position. This point is deflection point B referred to in connection with Fig. 2.

Hence the distance B—C is the measure of spring deflection, and the spring S must be deflected through this distance in assembling the device. As thus assembled the device carries out the theory explained above in connection with Fig. 2.

Certain practical details are also illustrated in Fig. 3. Thus, the spring rod 32 is provided with two fixed collars 38a and 38b, which alternately engage support plate 31 to act as stops for the upper and lower extreme of permitted hanger movement.

In order to hold spring S in alinement and prevent it from buckling, telescoping sleeves 39a and 39b are fixed to the support plate 31 and the compressor plate 30 respectively. These sleeves 39a and 39b have a large enough internal bore that they do not interfere with movement of the spring rod as it swings about its pivot R.

The parts illustrated in Figs. 3 and 4 may be assembled to form a hanger for supporting a heavier load by making a few adjustments. For this purpose the pivot point C would be located on the balance arm $L_1$ a greater distance from pivot A; the spring seat 31 would be moved upwardly a corresponding distance before attachment to support member 36; and the spring S would be compressed a greater distance corresponding with the longer distance from pivot point C to the new deflection point B.

Conversely, an assembly for supporting a lighter load can be made by decreasing the length of balance arm $L_1$; mounting the spring seat 31 in a lower position on support member 36; and compressing spring S a lesser distance corresponding with the lessened distance from pivot C to the new deflection point B.

In designing any of these hangers the angle $\theta_2$ of inclination of line A—B would remain equal to angle $\theta_1$ between the arms of the bell crank, and deflection point B would be located on the axis of the spring rod when the spring rod is in its central or intermediate position.

Figs. 5 and 6 illustrate a form of the invention which incorporates the principles of Fig. 2 in a different manner. This form uses two bell crank assemblies.

This construction comprises a supporting frame 50, formed by a pair of plates 50a and 50b suitably connected together. Bell cranks 52 are mounted on pivots A at the upper and lower ends of frame 50. The upper bell crank has the outer end of its load arm $L_2$ pivoted at D to a support rod 54, which is attached to a supporting structure. The lower bell crank has its load arm $L_2$ pivoted at D to a hanger rod 55 connected to the load.

Spring seat 61 is attached to frame 50, by welding or otherwise, and spring S is compressed between the spring seat 61 and the compressor plate 62. A pair of spring rods 60 are located inside spring S at upper and lower positions, and have their outer ends pivoted on the outer surface of the compressor plate 62. Conveniently, washers 64 having rounded end portions engaging the compressor plate 62 may be provided to permit free rocking of the spring rods about pivot points R. Nuts 63 hold the washers 64 in place.

The inner ends of the spring rods pass through slots formed in spring seat 61, and are connected at pivot points C to the balance arms $L_1$ of the bell cranks. Pivots C are formed by pins 58 passing through eyes 59 formed on the spring rods.

The deflection points B are determined as previously explained, and the spring S is compressed a distance equal to the distance B—C before the device is assembled.

Abutments 65 and 66 fixed on the spring rods serve as stops when they engage opposite sides of the spring seat 61.

A tubular spring housing 67 is attached to the spring seat 61 and serves as a guide for the compressor plate 62 and to maintain the spring S in axial alignment.

The hanger of Figs. 5 and 6 is particularly useful in supporting lighter loads over a longer distance of travel. In this case the entire hanger will move upward or downward one-half the distance travelled by the load. Also, the movement of the load may be strictly vertical.

The embodiment illustrated in Figs. 7, 8 and 9 may be said to be the converse of that just described, since it uses a single bell crank and two springs.

In this form a single plate 70 forms the supporting frame and is carried by rods 72 from a suitable supporting structure.

The bell crank construction 74 includes a pair of triangular plates 74a and 74b located on opposite sides of the frame 70, and pivoted at A on the frame 70 by a hinge pin 76. The hanger rod 75 is pivoted at D to the outer ends of the load arms L₂ by means of hinge pin 73.

A large oval spring seat 80 is secured to the frame 70, and the inner ends of two springs S rest against the spring seat 80. An oval compressor plate 82 engages the outer ends of springs S, and a reinforcing strip 90 is secured to the outer surface of compressor plate 82, to equalize the pressure of the spring rods over both sides of the coil spring.

Spring rods 78a and 78b pass through the springs S, and as shown in Fig. 7 each spring rod is mounted close to the spring wall that is adjacent to the other spring. This arrangement permits keeping the two bell crank plates close together while using springs of relatively large diameter.

The outer end of each spring rod passes with a loose fit through the compressor plate 82 and the reinforcing strip 90. Washers 88 formed with rounded surfaces provide a rocking bearing at point R for the ends of the spring rods, and are secured by nuts 84.

In this case the spring rods 78a and 78b help to prevent buckling of the inner edge of the springs S, but additional support for the springs is furnished by telescoping supports 86a and 86b, which are attached to the compressor plate 82 and the spring seat 80 respectively.

Here again, the deflection points B are determined as previously explained, and the springs S are compressed a distance equal to distance B—C before the device is assembled.

Figs. 10 and 11 illustrate a modified arrangement for mounting the supporting frame. A supporting frame 100, formed of two plates 100a and 100b is mounted by a hinge pin 104 which passes through depending legs 106 and 108 of the bracket 102 and through web blocks 110 connected to plates 100a and 100b. Bracket 102 may be mounted to a structure by bolts passing through holes 103. This construction permits the hanger to rock about the axis of the pivot pin 104.

Fig. 12 shows an alternative construction which permits increased rocking movement of the outer end of spring rod 120 relative to the compressor plate 122. In this case knife edge elements 130 ride in notches 126 formed in washers 124. The knife edge elements 130 are carried by a collar 128 mounted on spring rod 120 and held in place by nut 132. The point R is established at the apex of the knife edges, and obviously this structure provides for a minimum of friction at this point.

Figs. 13 to 15 illustrate an embodiment which in general is similar to that shown in Figs. 3 and 4, but provides a different means for supporting and guiding the spring elements.

In this case the supporting frame 140 is carried by a pivot pin 148 mounted on lugs 146 which depend from stationary plate 144. Frame 140 is composed of identical plates 140a and 140b between which extend a pair of connecting bars or struts 150, which are apertured to receive the pin 148. With this construction frame 140 is held rigid against movement in the plane containing the axes of the several pivot connections, but is allowed to rock laterally on the hinge pin 148.

Mounted in a fixed position on frame 140 is the spring seat 152, provided with slot 154 for movement therein of the spring rod 156. The compressor plate 160 is held on the outer end of the spring rod by nuts 158.

A tubular guide 162 is fastened to spring seat 152 and carries within its outer end a guide bushing 164 pivotally mounted on pivot pins 166 (Fig. 14). The tubular guide 162 is of substantial length so as to bring the axis of the pivot pins 166 as close as conveniently possible to the compressor plate 160, thus reducing the vertical movement of the outer end of the spring rod.

The spring rod 156 is slidably mounted within the guide bushing 164, so that as the bell crank 170 moves with the load, the spring rod slides in guide bushing 164 and pivots about the axis of the pivot pins 166.

This method of supporting and guiding the spring rod serves, like the telescoping sleeves 38a and 38b of Fig. 3, to prevent excessive lateral deflection of the spring, but is an improvement over the structure of Fig. 3 in that the frictional resistance of the spring rod sliding in the guide bushing 164 is less than that resulting from the telescoping sleeves.

The bell crank arrangement of Fig. 13 is similar to that previously described.

Stops are provided to limit upward and down movement of the mechanism.

An upward stop is provided by engagement of the upper corner of the bell crank adjacent pivot C with the inner face of the support plate 152. This is the position illustrated in Fig. 13.

A downward stop is provided by a washer and nut assembly 168 mounted in adjustable position on spring rod 156, and which engages the end of tubular guide 162 at the end of downward travel.

Fig. 16 illustrates a type of hanger support which includes an eye nut 180 adapted to engage a pin 182 extending between laterally-spaced frame plates 184. The frame in this case is provided for substantially universal adjustment about a pivot determined by the location of the eye nut 189 and pin 182. With the use of this mounting the support frame 184 should be designed so that the pivot point D is located generally beneath the pin 182, offset therefrom by an amount which represents the displacement necessary to counterbalance the weight of the load support, including the counterbalance spring, and to bring the axis of the spring support into the desired operating position. This type of hanger support may be used with most of the hanger constructions disclosed herein.

The form of the device illustrated in Fig. 17 is identical with that of Fig. 13 except that the spring is disposed in a vertical position. In this case the angle between the bell crank arms is the obtuse angle $\theta_1$, and the angle between the load axis and the axis A—B is angle $\theta_2$, which is equal to angle $\theta_1$.

The device of Fig. 18 is similar to Fig. 17 except that a guide sleeve 222 is rigidly secured to the support plate 220, and the compressor plate 226 has a sliding fit within sleeve 222. In this form the sleeve 222 supports and guides the spring. It should be understood that where the spring is disposed horizontally, the outer sleeve may be rigidly attached to the spring support plate and serve to guide and support the spring. Such a structure is shown diagrammatically in Fig. 2.

Figs. 19 and 20 illustrate a commercial form of hanger which is basically the same as Fig. 13, but with a few variations.

In this form the support plates 239 are mounted on a base plate 240 and reinforced by buttress plates 241. Bell crank plates 242 are mounted to pivot at A on the support plates 239. A hanger rod 243 carries an eye 244 which is pivoted at D to the bell crank. The inner end of the spring arm is pivoted at C to the bell crank.

The base plate 240 may be bolted or otherwise secured to a beam of the building.

A telescoping housing has its inner section 245 secured to the spring seat 246, which is welded to the support plates 239. The outer section 247 of the housing is secured to the outer surface of the compressor plate 248. This telescoping housing is not a structural part of the hanger, but merely serves to house and protect the spring.

In this form the support for the spring is identical with that shown in Fig. 13.

An indicator mark 249 placed on the bell crank cooperates with a scale 250 mounted on a support plate to indicate the angular position of the bell crank, and hence the position of the load.

To provide for a slight field adjustment after the hanger has been installed, the nut 251 may be moved on the spring rod 252 to compensate for any slight errors in determining load or position. A housing 253 attached to lock nut 254 is provided with a window 255 and a scale 256 to indicate the amount of the field adjustment, since the end of the spring rod is visible in window 255.

All of the different embodiments disclosed herein have been shown as utilizing a compression coil spring, since this is the preferred type of spring. However, it should be pointed out that any equivalent type of spring may be used.

It should be pointed out that in Figs. 1 and 2 the hanger is shown in a middle position, i.e., the load is in the middle of its permitted vertical travel, and the rod D is therefore in the middle of its permitted swing about its outer end. In the remaining figures, the commercial forms are shown with the parts at their extreme upper end of travel, which is the position of the hanger when the spring is in its most relaxed position. The hanger is installed in this position when it is to support a pipe which will move downwardly as the pipe expands.

If at a particular location the pipe expands upwardly, the hanger will be attached in its downward position to the cold pipe.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a hanger of the type which comprises:
a support;
a spring seat mounted on said support;
a bell crank mounted on the support by a horizontal pivot spaced from said spring seat;
the bell crank having angularly-related load and balance arms;
a hanger rod pivoted to the outer end of the load arm, said hanger rod being adapted for connection to the load, and providing a vertical load axis;
a longitudinally extending spring having one end seated on said spring seat;
and a spring rod extending longitudinally of said spring, the outer end of the spring rod being connected to the outer end of the spring, and the inner end of the spring rod being pivotally attached to the balance arm of the bell crank to form a balance pivot;
said spring being initially compressed a predetermined amount measured partly by the angle between the load and balance arms of the bell crank;
the improvement which comprises having said spring seat attached rigidly to said support;
whereby as the parts move the changing leverage of the bell crank compensates for the changing resistance of the spring to produce a substantially constant support for the load as it moves.

2. A device as specified in claim 1 in which the spring is a compression coil spring.

3. A device as specified in claim 1 in which the spring is a compression coil spring, and means is provided to guide and support the spring.

4. A device as specified in claim 3 in which the guide means extends within the spring and has one end rigidly secured to the spring seat.

5. A device as specified in claim 3 in which the guide means comprises a tubular housing surrounding the spring and rigidly attached to the spring seat.

6. A device as specified in claim 1 in which the spring when assembled in the hanger is deflected by an amount corresponding to the distance between said balance pivot and a deflection point;
said deflection point being located at the intersection of the axis of the spring rod when in its central position, and a line drawn through the bell crank pivot and inclined from the load axis toward the spring at an angle equal to and in the same direction from the load axis as the angle and direction at which the balance arm is located from the load arm.

7. A device as specified in claim 3 in which the guide means comprises a guide tube having one end rigidly attached to the spring seat and extending within the coil spring;
the guide tube being of an internal diameter larger than the spring rod;
and a bushing pivotally mounted in the outer end of the guide tube and having a close sliding fit on the spring rod.

8. A device as specified in claim 3 in which the coil spring extends horizontally.

9. A device as specified in claim 3 in which the coil spring extends vertically.

10. A device as specified in claim 1 in which the spring is a compression coil spring, and having
a guide tube having one end rigidly attached to the spring seat and extending within the coil spring;
the guide tube being of an internal diameter larger than the diameter of the spring rod;
the spring seat being formed with an opening larger than the diameter of the spring rod;
and a bushing pivotally mounted in the outer end of the guide tube;
the spring rod having a close sliding fit in said bushing and being free to move laterally within the guide tube and the opening in the spring seat;
whereby upon rocking movement of the bell crank, the spring rod is free to follow the rocking movements of said balance pivot.

11. A device as specified in claim 10 in which the spring when assembled in the hanger is deflected by an amount corresponding to the distance between said balance pivot and a deflection point;
said deflection point being located at the intersection of the axis of the spring rod when in its central position, and a line drawn through the bell crank pivot and inclined from the load axis toward the spring at an angle equal to the angle included between the arms of the bell crank.

References Cited in the file of this patent

UNITED STATES PATENTS

| | | |
|---|---|---|
| 2,159,870 | Wert | May 23, 1939 |
| 2,593,502 | Thomson | Apr. 22, 1952 |
| 2,709,057 | Gould | May 24, 1955 |
| 2,756,014 | Leibfried | July 24, 1956 |